Aug. 11, 1925.
J. F. GOETZ
1,549,109
VALVE
Filed Aug. 3, 1923
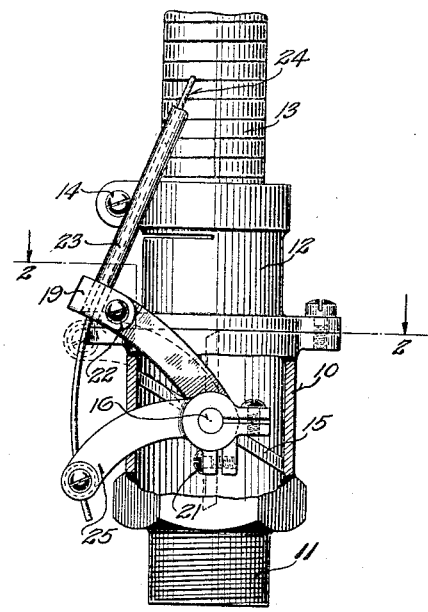
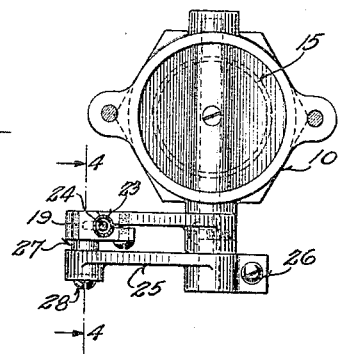
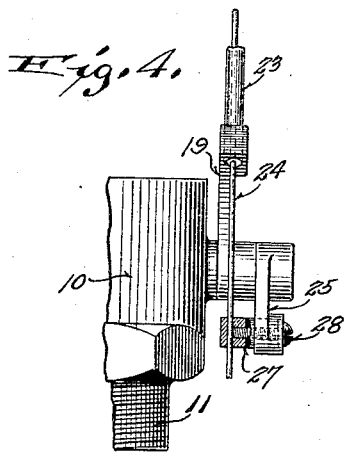
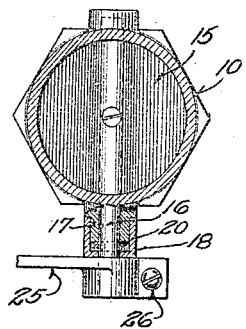
INVENTOR.
Julius F. Goetz.
BY
Morsell, Keeney & Morsell.
ATTORNEYS.

Patented Aug. 11, 1925.

1,549,109

UNITED STATES PATENT OFFICE.

JULIUS F. GOETZ, OF HARTFORD, WISCONSIN.

VALVE.

Application filed August 3, 1923. Serial No. 655,460.

*To all whom it may concern:*

Be it known that I, JULIUS F. GOETZ, a citizen of the United States, and resident of Hartford, in the county of Washington and State of Wisconsin, have invented new and useful Improvements in Valves, of which the following is a description, reference being had to the accompanying drawings, which are a part of this specification.

This invention relates to valves, and particularly to valves adapted for use in connection with an automobile engine, the valve being designed for transmitting air or exhaust gas collected from or around the exhaust pipe of the automobile engine to the body of the machine for heating purposes and the like. However, while this is mentioned as the primary object of the invention, it will be apparent, as the description proceeds, that the valve herein described is adapted for numerous other uses.

The invention consists in the novel combination, construction and arrangement of parts, all of which will be made more apparent hereinafter as this description proceeds, especially when considered in connection with the accompanying drawings, wherein;

Figure 1 is a side elevation, partly in section, of a valve constructed in accordance with this invention;

Fig. 2 is a horizontal sectional view, taken substantially on the plane indicated by the line 2—2 in Fig. 1;

Fig. 3 is a transverse sectional view, through the valve; and,

Fig. 4 is an enlarged fragmentary elevational view.

Referring now particularly to the drawings wherein like reference characters indicate like parts, it will be noted that there is provided a valve casing 10, which is preferably of tubular formation, and is provided with a threaded extension 11, at one end thereof, for engagement, for instance, with an exhaust pipe or an air collector associated with an exhaust pipe. The other end of the casing 10 is flanged, and has bolted thereto an extension 12, preferably split so as to enable the same to be clamped to a flexible tube 13, by means of a bolt 14.

Arranged diagonally of the casing 10 is a valve 15, this valve being of the butterfly type. The valve is oval shape in plan view, and in its closed position is arranged diagonally within the casing in the manner illustrated in Fig. 1, thus snugly fitting the inner surface of the casing to completely cut off communication therethrough. As thus positioned, a one-eighth turn of the valve will move it to open position, as will be immediately apparent.

The valve is mounted upon a valve rod 16, which projects through one side of the casing, and through an extension 17, formed on the casing. This extension on the casing 10 is adapted to receive the hub portion 18 of a fixed guide, 19, the hub 18 forming a stuffing nut or sleeve, there being interposed between the hub 18 and extension 17, a packing 20, thereby forming a fluid-proof closure around the valve rod 16. Connection between the hub 18 and extension 17 is provided by splitting the hub 18 and clamping the same upon the extension 17 by means of a bolt 21.

The upper portion of the guide 19 is also split and is clamped, by means of a bolt 22, around the end of a guide tube 23, formed preferably of easily bendable material, through which there extends an actuating cable or wire 24, formed preferably of steel or brass wire, this actuating cable in practice extending to the instrument board of the automobile for manual operation.

A valve operating lever 25 is clamped by means of a bolt 26 to the outer end of the valve rod 16, the free end of this lever carrying a block 27, secured thereto by means of a bolt 28, by means of which connection is made between the operating wire 24 and the lever 25.

From the foregoing it will be obvious that when the operating cable 24 is actuated in the proper direction the valve operating lever 25 will be swung upwardly as viewed in Fig. 1, to move the valve from its closed position to its open position, or substantially parallel with the bore of the valve casing. As has been remarked hereinbefore, the valve is movable from its closed to its open position by a one-eighth turn.

The valve may be conveniently actuated, as has also been remarked hereinbefore, by connecting the actuating cable 24 to a manually operated controlling device, suitably mounted upon the dashboard of the vehicle. The arm 19 not only serves as a support for the guide tube 23, but the hub thereof is also employed, as heretofore pointed out, as a stuffing nut for making a fluid-tight connection around the valve rod 16.

A valve device constructed in accordance with this invention may be manufactured at a minimum cost and may be quickly and easily assembled and is efficient in operation.

While one specific embodiment of the invention has been illustrated herein in detail, it is not intended to unnecessarily limit the same, but reservation is made to make such changes as may come within the purview of the accompanying claims.

Having thus described the invention, what is claimed is:

1. In a valve of the class described, a tubular casing, an extension bolted to one end thereof, said casing having inlet and outlet openings, a butterfly valve in said casing, a rod extending transversely of said casing and rigidly connected to said valve, said casing being formed with a lateral extension through which said rod extends, a control lever connected to said rod, an operating wire connected to said lever and a guide arm mounted on said lateral extension.

2. In a valve of the class described, a tubular casing, an extension bolted to one end thereof, said casing having inlet and outlet openings, a butterfly valve in said casing, a rod extending transversely of said casing and rigidly connected to said valve, said casing being formed with a lateral extension through which said rod extends, a control lever connected to said rod, an operating wire connected to said lever and a guide arm provided with a hub portion forming a stuffing nut mounted on said lateral extension.

3. In a valve of the class described, a tubular casing, an extension bolted to one end thereof, said casing having inlet and outlet openings, a butterfly valve in said casing, a rod extending transversely of said casing and rigidly connected to said valve, said casing being formed with a lateral extension through which said rod extends, a control lever connected to said rod, an operating wire connected to said lever and a guide arm provided with a hub portion forming a stuffing nut and means for clamping said hub portion on said lateral extension.

4. In a valve of the class described, a tubular casing having a threaded end for connection with an exhaust manifold or the like, an extension bolted on the other end of said casing and provided with means for detachably connecting it with a flexible tube or the like, a butterfly valve mounted within said casing, a rod therefor extending through said casing, said casing having a lateral extension through which said rod extends, a lever detachably connected to the end of said rod, an operating member connected to said lever, a guide arm detachably connected to said lateral extension and means on said guide arm for supporting a guide tube for said operating member.

5. In a valve of the class described, a tubular casing having a threaded end for connection with an exhaust manifold or the like, an extension bolted on the other end of said casing and provided with means for detachably connecting it with a flexible tube or the like, an oval valve angularly disposed within said casing and movable to open position by a one-eighth turn, a rod therefor extending through said casing, said casing having a lateral extension through which said rod extends, a lever detachably connected to the end of said rod, an operating member connected to said lever, a guide arm detachably connected to said lateral extension and means on said guide arm for supporting a guide tube for said operating member.

In testimony whereof, I affix my signature.

JULIUS F. GOETZ.